(12) United States Patent
Choi et al.

(10) Patent No.: US 9,156,424 B2
(45) Date of Patent: Oct. 13, 2015

(54) MULTI-WRAP AIRBAGS AND RELATED METHODS AND SYSTEMS

(71) Applicant: Autoliv ASP, Inc., Ogden, UT (US)

(72) Inventors: ChangSoo Choi, Rochester, MI (US); Brian Joseph Borton, Grand Blanc, MI (US)

(73) Assignee: Autoliv ASP, Inc., Ogden, UT (US)

( * ) Notice: Subject to any disclaimer, the term of this patent is extended or adjusted under 35 U.S.C. 154(b) by 75 days.

(21) Appl. No.: 14/051,316

(22) Filed: Oct. 10, 2013

(65) Prior Publication Data

US 2015/0102589 A1   Apr. 16, 2015

(51) Int. Cl.
*B60R 21/201* (2011.01)
*B60R 21/237* (2006.01)

(52) U.S. Cl.
CPC .............. *B60R 21/201* (2013.01); *B60R 21/237* (2013.01)

(58) Field of Classification Search
CPC ........................ B60R 21/201; B60R 21/237
See application file for complete search history.

(56) References Cited

U.S. PATENT DOCUMENTS

| 5,605,350 | A | 2/1997 | Bates et al. |
| 6,131,944 | A | 10/2000 | Henkel et al. |
| 6,883,831 | B2 | 4/2005 | Hawthorn et al. |
| 7,314,228 | B2 | 1/2008 | Ishiguro et al. |
| 7,396,044 | B2 | 7/2008 | Bauer et al. |
| 7,878,534 | B2 | 2/2011 | Kumagai et al. |
| 8,608,195 | B2 * | 12/2013 | Yamada ...................... 280/732 |
| 2002/0020995 | A1 * | 2/2002 | Abe et al. ................... 280/743.1 |
| 2007/0090630 | A1 * | 4/2007 | Wilmot ...................... 280/728.2 |
| 2011/0241317 | A1 * | 10/2011 | Lee ............................... 280/729 |
| 2013/0320655 | A1 * | 12/2013 | Takagi ........................ 280/743.1 |
| 2014/0097600 | A1 * | 4/2014 | Hayashi et al. ............ 280/728.3 |

* cited by examiner

*Primary Examiner* — Drew Brown
(74) *Attorney, Agent, or Firm* — Phillips Ryther & Winchester; Matthew D. Thayne

(57) ABSTRACT

Methods, apparatus, and systems for packing or deploying airbag cushions, such as driver side airbag cushions, to improve unfolding kinematics and/or otherwise improve performance. In some implementations of methods for packing an airbag cushion, a first portion of an airbag cushion may be compressed and then secured in a compressed configuration using a first wrap. A second portion of the airbag cushion may then be compressed and secured in a second compressed configuration using a second wrap. The resulting airbag cushion assembly may be configured to separate the wraps sequentially, rather than simultaneously, during inflation of the airbag cushion.

23 Claims, 4 Drawing Sheets

MULTI-WRAP AIRBAGS AND RELATED METHODS AND SYSTEMS

SUMMARY

Methods, apparatus, and systems are disclosed herein that relate to packing and deployment of airbag cushions, such as driver side airbag cushions, in order to achieve particular desired kinematics and/or performance during deployment. Some embodiments and implementations may be particularly useful to reduce punch-out forces associated with airbag deployment. For example, some such embodiments and implementations may be useful in reducing chest deflection/punch-out forces caused by airbag deployment. Some embodiments and implementations may additionally, or alternatively, be useful in avoiding neck injuries, or otherwise meeting or exceeding certain motor vehicle safety standards.

In one more particular example of a method according to an implementation of the invention for packing an airbag cushion, the method may comprise compressing a first portion of an airbag cushion. In some implementations, this step may comprise folding and/or rolling the first portion of the airbag cushion. The first portion of the airbag cushion may comprise opposing sides of the airbag cushion positioned on opposite sides of the airbag cushion. For example, in some implementations, the first portion of the airbag cushion may comprise a top side of the airbag cushion and a bottom side of the airbag cushion (as viewed relative to a vehicle incorporating the airbag cushion and/or driver of such a vehicle). In other implementations, the first portion of the airbag cushion may comprise opposing lateral sides of the airbag cushion.

The method may further comprise securing a first wrap about the compressed first portion. The first wrap may be configured to separate upon inflation of the airbag cushion. In some implementations, the first wrap may comprise a weakened portion configured to break upon inflation of the airbag cushion. For example, the first wrap may comprise a tear seam configured to break upon experiencing a threshold amount of force. In other embodiments, one or more of the wraps may be frangible or weak as a whole, rather than comprising a specific weakened portion, such that the wraps are configured to break upon experiencing a threshold force but not necessarily at a predetermined portion of the wrap(s).

The method may further comprise compressing a second portion of the airbag cushion. As with regard to the first portion, the step of compressing the second portion of the airbag cushion may comprise folding and/or rolling the second portion of the airbag cushion.

A second wrap may then be secured about the compressed second portion. As with the first wrap, the second wrap may be configured to separate upon inflation of the airbag cushion. Thus, the second wrap may comprise a weakened portion, such as a tear seam, configured to break upon inflation of the airbag cushion. The airbag may be configured to separate the second wrap prior to the first wrap during inflation of the airbag cushion. In other words, the configuration and/or positioning of the two wraps may allow for sequential, rather than simultaneous, separation of the two wraps, which may provide for desired kinematics/performance.

In some implementations, the airbag cushion may comprise an inflator opening. In some such implementations, a step of compressing the first portion of the airbag cushion may comprise at least one of folding and rolling a top side of the airbag cushion towards the inflator opening, and at least one of folding and rolling a bottom side of the airbag cushion towards the inflator opening.

In such implementations, the second portion of the airbag cushion may comprise a first lateral side of the airbag cushion and a second lateral side of the airbag cushion. As such, the step of compressing the second portion of the airbag cushion may similarly comprise at least one of folding and rolling the first lateral side of the airbag cushion towards the inflator opening, and at least one of folding and rolling the second lateral side of the airbag cushion towards the inflator opening.

In some implementations, the steps of securing the first wrap about the compressed first portion and securing the second wrap about the compressed second portion may be performed such that the first wrap extends at an angle relative to the second wrap. In some such implementations, the steps of securing the first wrap about the compressed first portion and securing the second wrap about the compressed second portion may be performed such that the first wrap extends in at least a substantially perpendicular direction relative to the second wrap.

As another example of a method according to one implementation of the invention, the method may begin by at least one of rolling and folding a first set of opposing sides of an airbag cushion towards an inflator opening of the airbag cushion to form a first compressed airbag configuration. An inner wrap may then be secured about the first compressed airbag configuration. The inner wrap may be configured to break upon inflation of the airbag cushion to allow the airbag cushion to expand. In some implementations, the inner wrap may comprise a weakened portion, such as a tear seam, configured to break upon inflation of the airbag cushion to allow the airbag cushion to expand.

The method may then continue by at least one of rolling and folding a second set of opposing sides of an airbag cushion towards an inflator opening of the airbag cushion to form a second compressed airbag configuration. In some implementations, the second set of opposing sides may extend in a direction at least substantially perpendicular to the first set of opposing sides. For example, the first set of opposing sides may be lateral sides and the second set of opposing sides may be the top and bottom of the cushion, or vice versa.

An outer wrap may then be secured about the second compressed airbag configuration such that the inner wrap is positioned within the second compressed airbag configuration and within the outer wrap. The outer wrap may also be configured to break upon inflation of the airbag cushion to allow the airbag cushion to expand. In some implementations, the outer wrap may comprise a weakened portion, such as a tear seam, configured to break upon inflation of the airbag cushion to allow the airbag cushion to expand.

The wraps may be applied and/or the airbag may be configured such that the outer wrap breaks prior to the inner wrap during inflation of the airbag cushion. In some implementations, the steps of securing the inner wrap about the first compressed airbag configuration and securing the outer wrap about the second compressed airbag configuration may be performed such that the inner wrap extends at least substantially perpendicular to the outer wrap in final assembled state of the airbag cushion assembly.

In an example of an airbag assembly for a vehicle according to one embodiment, the assembly may comprise an airbag cushion. An inner wrap may be positioned around a first portion of the airbag cushion, and the inner wrap may be configured to separate upon inflation of the airbag cushion. An outer wrap may be positioned around a second portion of the airbag cushion, and the outer wrap may also be configured to separate upon inflation of the airbag cushion. The inner wrap may be positioned within the outer wrap, and the inner and outer wraps may be positioned and configured such that deployment of the airbag cushion with an inflator results in sequential separation of the inner and outer wraps. In some embodiments, the airbag cushion may be configured such that the outer wrap tears or otherwise separates before the inner wrap tears or otherwise separates during deployment of the airbag.

In some embodiments, the outer wrap may be positioned at least substantially perpendicular to the inner wrap. In some embodiments, the inner wrap may also, or alternatively, be positioned around the first portion of the airbag cushion such that there is slack between the inner wrap and the first portion of the airbag cushion. In other words, the inner wrap may deliberately be wrapped loosely around the first portion of the airbag cushion. The outer wrap, on the other hand, may be positioned around the second portion of the airbag cushion tightly such that there is no slack between the outer wrap and the second portion of the airbag cushion.

The inner wrap may comprise a different material than the outer wrap, which may be useful in achieving the desired tearing and deployment sequences. Thus, in some embodiments, the inner wrap may be made up of a material having a stiffness greater than a stiffness of the material used to make up the outer wrap. Alternatively, or additionally, the inner wrap may comprise a weakened portion that is stronger than the weakened portion of the outer wrap such that the outer wrap is configured to separate with less force than the inner wrap. In some embodiments, this may be accomplished by providing an inner wrap tear seam that is longer than a similar tear seam of the outer wrap. Alternatively, or additionally, the inner wrap tear seam may comprise fewer indentations, broken, or weakened segments.

In some embodiments, more than two wraps may be used. For example, in some embodiments, a second inner wrap may be positioned adjacent to the first inner wrap around the airbag cushion. In some such embodiments, this second inner wrap may be configured to separate upon inflation of the airbag cushion along with the first inner wrap and may be positioned parallel to the first inner wrap.

In some embodiments, the inner and outer wraps may be separate elements. Alternatively, the inner wrap and outer wrap may be attached to one another. For example, in some embodiments, the inner and outer wraps may be part of a single piece of material. In other words, the inner and outer wraps may be integrally coupled with one another.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems, apparatus, and methods disclosed herein may be used to achieve improved airbag kinematics and/or performance during deployment. Some embodiments and implementations may be particularly useful to reduce punch-out forces associated with airbag deployment, such as chest punch-out forces caused by airbag deployment. In some embodiments and implementations, such improvements, and/or others, may be accomplished by providing multiple airbag wraps that may be configured to result in sequential deployment such that one wrap fails or otherwise separates before one or more other wraps during deployment. In some preferred embodiments and implementations, at least one wrap may be an inner wrap that may be positioned around an internal fold or configuration and at least one wrap may be an outer wrap positioned around another fold or configuration.

Figure 1:
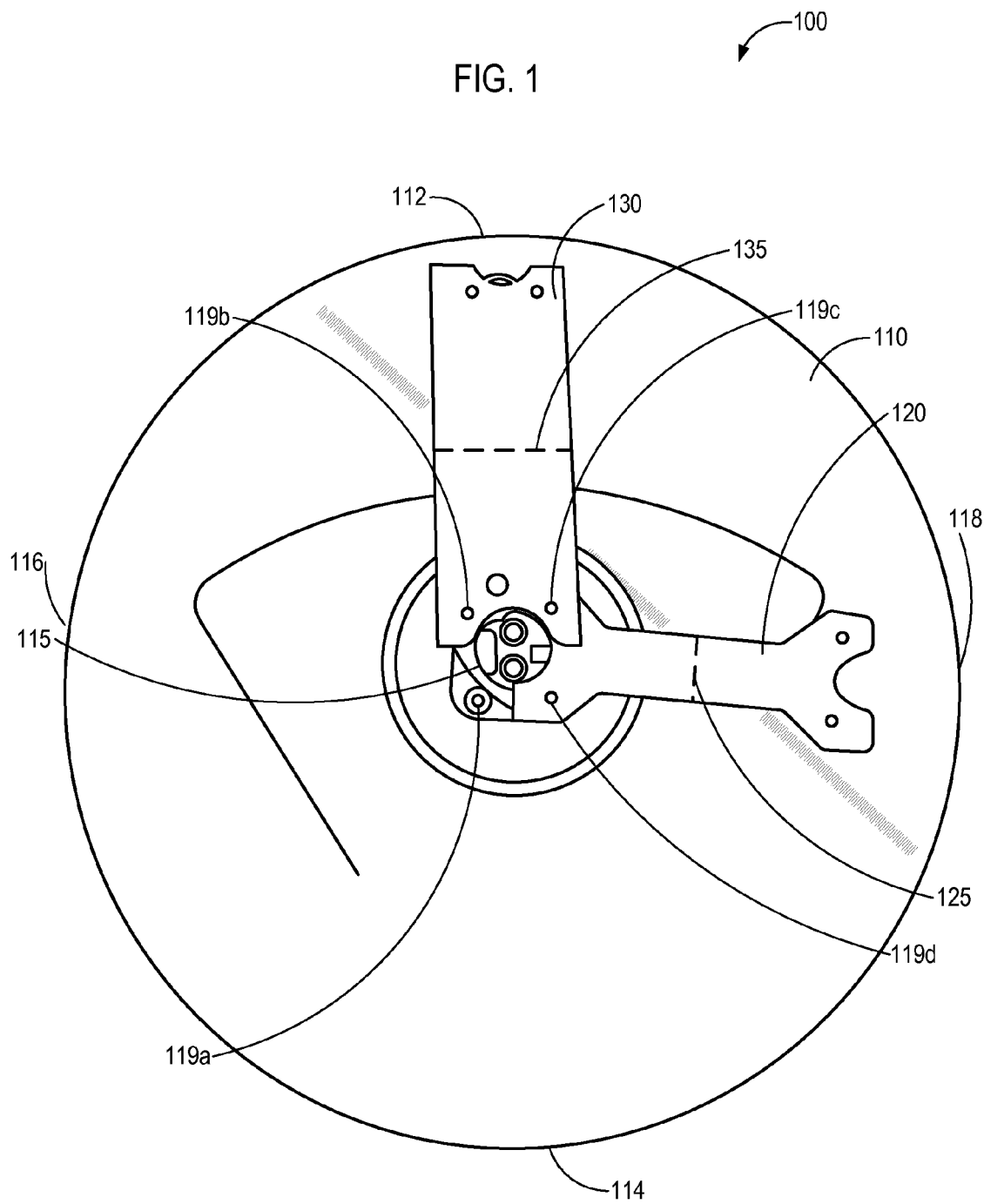
FIG. 1 depicts an embodiment of a vehicle airbag assembly comprising an inner wrap and an outer wrap.

Additional details of certain embodiments and implementations will now be discussed in greater detail in connection with the accompanying figures. FIG. 1 depicts an example of an airbag cushion assembly 100 according to one embodiment of the invention. Airbag cushion assembly 100 comprises an airbag cushion 110. Airbag cushion 110 comprises a top side 112, a bottom side 114, a first lateral side 116, and a second lateral side 118. As those of ordinary skill will appreciate, these sides are labeled relative to a vehicle and/or passenger in a vehicle incorporating the airbag cushion assembly 100 following deployment. In other words, it is expected that airbag cushion assembly 100 will be installed in a vehicle such that, upon inflation of airbag cushion 110, top side 112 is positioned adjacent to, or above, a driver or passenger's head and bottom side 114 will be positioned below top side 112 relative to such a driver/passenger, such as adjacent to the passenger/driver's abdomen or chest, for example.

Airbag cushion 110 further comprises an inflator opening 115. Inflator opening 115, which may be positioned at a central location on airbag cushion 110 and may be configured to receive an inflator therethrough that will be used to inflate airbag cushion 110 during deployment. Airbag cushion 110 may further comprise a plurality of openings 119a-d that may be used to couple a plurality of wraps to airbag cushion 110. Of course, alternative embodiments are contemplated. For example, in some embodiments, one or more of the wraps may be sewn directly to the airbag cushion 110. Some such embodiments may omit openings 119*a-d* and/or corresponding openings in the wraps.

More particularly, airbag cushion assembly 100 comprises an inner wrap 120 and an outer wrap 130. Both wraps comprise weakened sections configured to facilitate tearing of the wraps upon experiencing a threshold amount of force. In the depicted embodiment, these weakened sections comprise tear seams. Thus, inner wrap 120 comprises tear seam 125 and outer wrap 130 comprises tear seam 135.

However, in other embodiments, one or more of the wraps may be frangible or weak as a whole, rather than comprising a specific weakened portion, such that the wraps are configured to break upon experiencing a threshold force but not necessarily at a predetermined portion of the wrap(s).

In certain preferred embodiments, inner wrap 120 may be configured to tear or otherwise separate at a different stage during deployment of airbag cushion 110 than outer wrap 130. Preferably, inner wrap 120 is configured to tear or otherwise separate after outer wrap 130 during deployment. This sequence of deployment may be useful to reduce the punchout force received by a driver's (or passenger's) chest during deployment. Airbag cushion assembly 100 may be configured to provide for such sequential deployment in one or more of a number of ways.

For example, in some embodiments, inner wrap 120 may comprise a different material than outer wrap 130. For example, in some embodiments, inner wrap 120 may be made up of a material having a greater stiffness than the material used to make up outer wrap 130. Alternatively, or additionally, inner wrap 120 may comprise a weakened portion that is stronger than the weakened portion of outer wrap 130 such that outer wrap 130 will tear or otherwise separate with less force than inner wrap 120.

Thus, in the depicted embodiment, tear seam 125 may be stronger than tear seam 135 such that the desired deployment sequence will automatically result upon inflation of airbag cushion 110. For example, in some embodiments, tear seam 125 may be longer than tear seam 135. Alternatively, or additionally, tear seam 125 may comprise fewer indentations, broken, or weakened segments than tear seam 135.

As yet another example, in some embodiments, inner wrap 120 may also, or alternatively, be positioned around a folded and/or rolled portion of airbag cushion 110 with preconfigured slack in between the airbag cushion 110 and the inner wrap 120. In this manner, airbag cushion 110 may be configured such that there is an inherent delay between application of the inflation force needed to break tear seam 135 and the subsequent inflation force needed to break tear seam 125. In some such embodiments, outer wrap 130, by contrast, may be positioned around another folded and/or rolled portion of airbag cushion 110 tightly such that there is no slack between outer wrap 130 and this portion of airbag cushion 110.

In some embodiments, more than two wraps may be used. For example, in some embodiments, a second inner wrap may be positioned adjacent to the first inner wrap around the airbag cushion. In some such embodiments, this second inner wrap may be configured to separate upon inflation of the airbag cushion along with the first inner wrap.

In the embodiment depicted in FIG. 1, inner wrap 120 is separate from outer wrap 130. However, alternative embodiments are contemplated in which the inner and outer wraps may be part of a single piece of material or may otherwise be attached to one another.

It can also be seen that, in the depicted embodiment, wraps 120 and 130 both comprise four openings that may be configured to facilitate placement of these respective wraps around airbag cushion 110. More particularly, these openings may, in some embodiments, be aligned with similar openings 119*a-d* in airbag cushion 110 to allow for positioning of pegs or other projecting members to be positioned therethrough to secure the wraps in place. In some embodiments, these projecting members may be part of an inflator assembly.

In some embodiments, airbag cushion assembly 100 may be assembled in the stage depicted in FIG. 1 such that wraps 120 and 130 are prepositioned perpendicular to one another. Openings 119*a-d*, and the corresponding openings in wraps 120 and 130, may be spaced and positioned to facilitate this positioning. For example, in the depicted embodiment, these various openings are spaced and positioned such that wraps 120 and 130 may only be positioned at 3:00, 6:00, 9:00, or 12:00 positions relative to airbag cushion 110.

Figure 2:
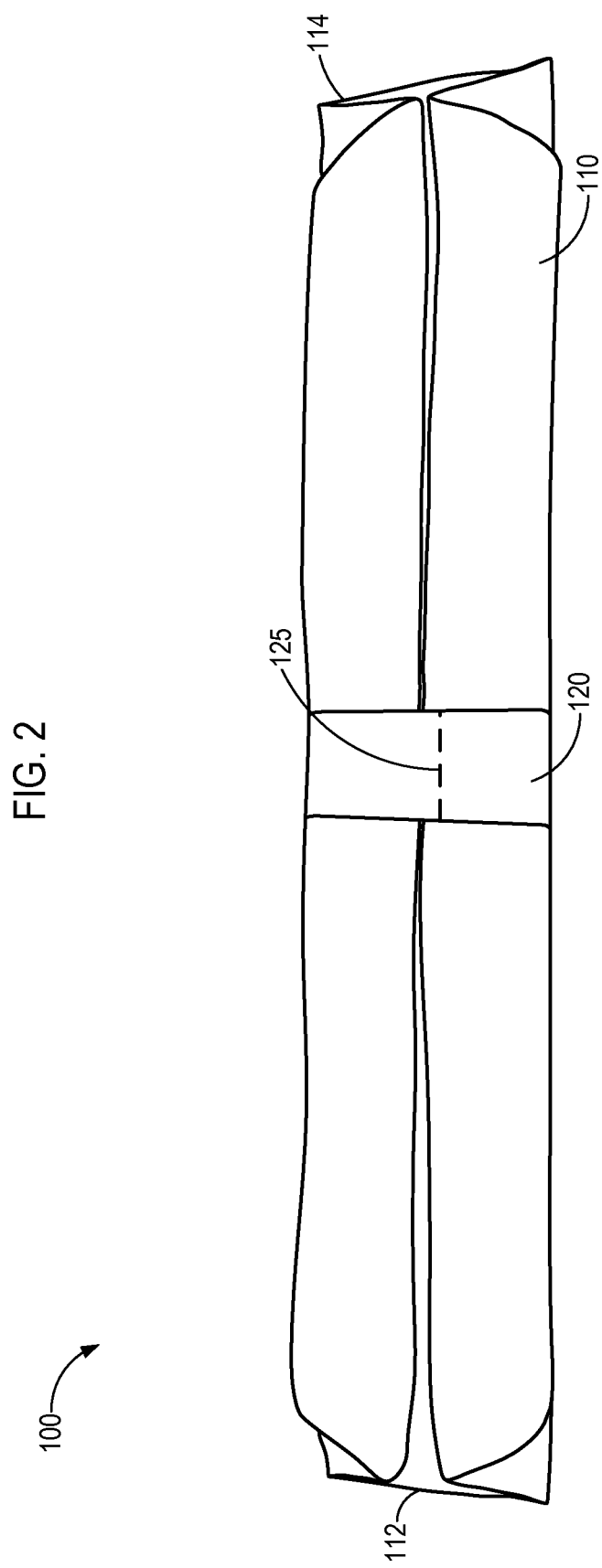
FIG. 2 depicts the vehicle airbag assembly of FIG. 1 after a first portion of the airbag cushion has been compressed and an inner wrap has been positioned around the compressed first portion.

FIG. 2 depicts vehicle airbag assembly 100 after a first portion of airbag cushion 110 has been compressed and after inner wrap 120 has been positioned around the compressed first portion. More particularly, the stage of assembly depicted in FIG. 2 may be reached by, for example, rolling and/or folding airbag cushion 110. This may be accomplished by, for example, first rolling and/or folding opposing sides, such as opposing lateral sides 116 and 118 or opposing top and bottom sides 112 and 114, respectively, towards the central inflator opening 115. In the assembly method used to arrive at the stage of assembly depicted in FIG. 2, lateral sides 116 and 118 have been folded and/or rolled toward one another and inner wrap 120 has been secured around this compressed portion of airbag cushion 110.

Figure 3:
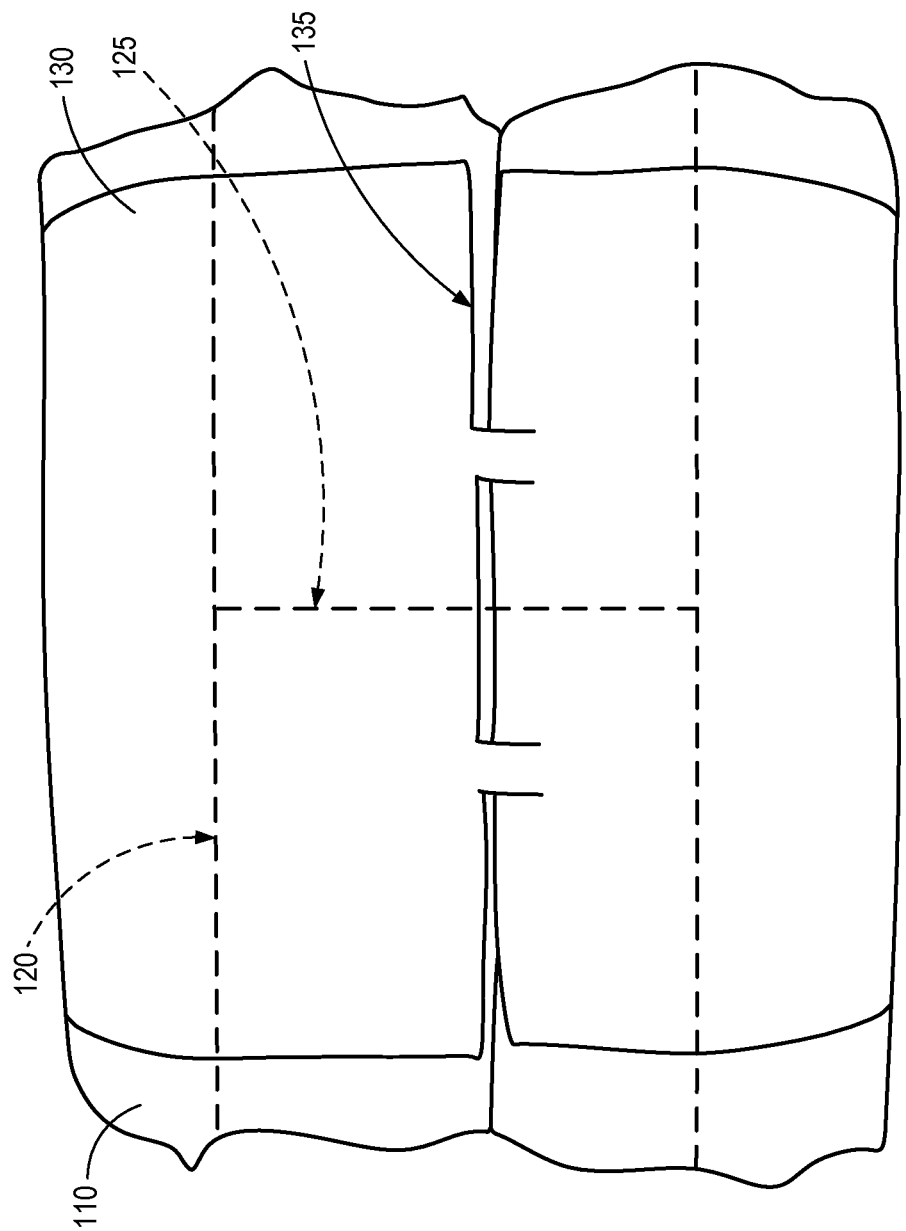
FIG. 3 depicts the vehicle airbag assembly of FIGS. 1 and 2 after a second portion of the airbag cushion has been compressed and an outer wrap has been positioned around the compressed second portion.

FIG. 3 depicts vehicle airbag cushion assembly 100 in a subsequent stage of assembly. More particularly, FIG. 3 depicts airbag cushion assembly 100 after a second portion of airbag cushion 110 has been compressed and outer wrap 130 has been positioned around the compressed second portion. In the specific embodiment depicted in the figures, the assembly stage depicted in FIG. 3 was reached by taking the assembly at the stage depicted in FIG. 2, rolling and/or folding in opposing sides of airbag cushion 110 (in particular, opposing top and bottom sides 112 and 114), and securing the resulting compressed airbag cushion 110 with outer wrap 130.

Although it should be understood that inner wrap 120 would not normally be visible after completing the packing of airbag cushion assembly 100, FIG. 3 also depicts in phantom the inner wrap 120, which is positioned within the compressed airbag cushion 110. This phantom depiction illustrates the fact that, in this particular embodiment, inner wrap 120 extends at least substantially perpendicular to outer wrap 130 and within outer wrap 130. It is expected that this may provide particular desirable inflation kinematics during deployment of airbag cushion 110.

Figure 4:
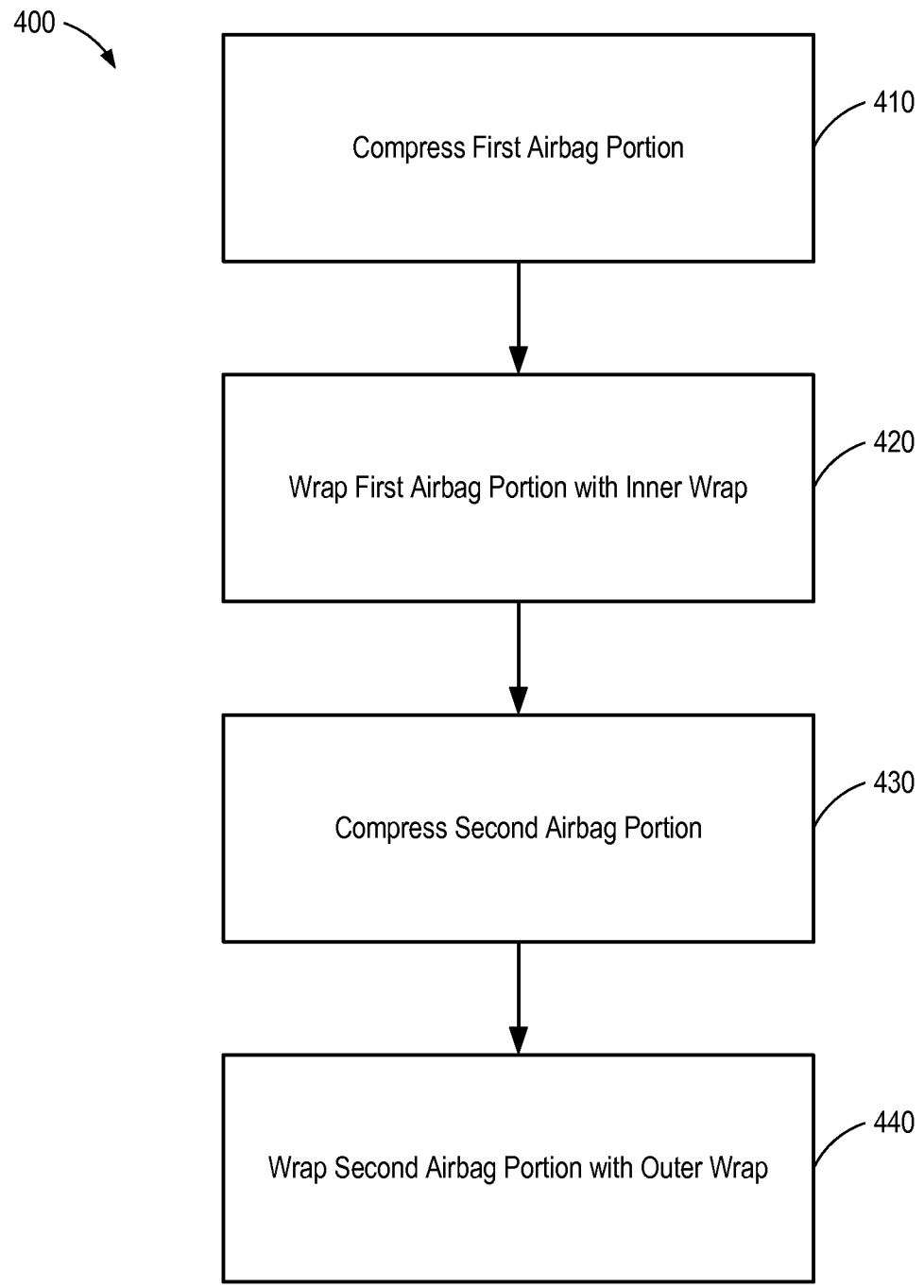
FIG. 4 is a flow chart illustrating one implementation of a method for packing an airbag cushion with multiple wraps.

FIG. 4 is a flow chart illustrating one implementation of a method 400 for packing an airbag cushion with multiple wraps. Method 400 may begin at step 410, at which point a first airbag portion may be compressed. In some implementations, step 410 may comprise folding and/or rolling the first portion of the airbag cushion. The first portion of the airbag cushion may comprise opposing sides of the airbag cushion positioned on opposite sides of the airbag cushion. For example, in some implementations, the first portion of the airbag cushion may comprise a top side of the airbag cushion and an opposing bottom side of the airbag cushion. Alternatively, the first portion of the airbag cushion may comprise opposing lateral sides of the airbag cushion.

Method 400 may then proceed to step 420, at which point the first airbag portion may be wrapped with one or more inner wraps. As described above, such inner wrap(s) may be configured to separate upon inflation of the airbag cushion. In some implementations, the first wrap may therefore comprise a weakened portion, such as a tear seam, configured to break upon inflation of the airbag cushion. In some implementations, a plurality of inner wraps may be used.

A second portion of the airbag cushion may then be compressed at step 430. Similar to step 410, in some implementations, step 430 may comprise folding and/or rolling the second portion of the airbag cushion. In some implementations, opposing sides of the airbag cushion may be rolled and/or folded together at step 410 and/or step 430. For example, in some implementations, opposing lateral sides of the airbag cushion may be rolled, folded, or otherwise compressed together at step 410. In such implementations, opposing top and bottom sides of the airbag cushion may then be rolled, folded, or otherwise compressed together at step 430. Alternatively, top and bottom sides of the airbag cushion may be rolled, folded, or otherwise compressed together at step 410 and opposing lateral sides of the airbag cushion may then be rolled, folded, or otherwise compressed together at step 430.

Following step 430, the second airbag portion that was rolled, folded, or otherwise compressed may be wrapped with an outer wrap and secured about the compressed second portion at step 440. Similar to the inner wrap, the outer wrap may be configured to separate upon inflation of the airbag cushion. Thus, the outer wrap may also comprise a weakened portion, such as a tear seam, that may be configured to break or otherwise separate upon inflation of the airbag cushion.

In preferred implementations, method 400 may be applied, and/or the materials, structures, components, etc. used in method 400 may be configured, such that the outer wrap tears or otherwise separates prior to the inner wrap during inflation of the airbag cushion. In other words, method 400 preferably provides for sequential, rather than simultaneous, separation of the inner and outer wraps.

In some implementations, steps 420 and 440 may be performed such that the inner wrap extends at an angle relative to the outer wrap. In some such implementations, steps 420 and 440 may be performed such that inner wrap extends in at least a substantially perpendicular direction relative to the outer wrap.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A method for packing an airbag cushion, the method comprising the steps of:
    compressing a first portion of an airbag cushion;
    securing a first wrap about the compressed first portion, wherein the first wrap is configured to separate upon inflation of the airbag cushion;
    compressing a second portion of the airbag cushion; and
    securing a second wrap about the compressed second portion, wherein the second wrap is configured to separate upon inflation of the airbag cushion, and wherein the second wrap is configured to separate upon inflation of the airbag cushion with less force than the first wrap.

2. The method of claim 1, wherein the step of compressing the first portion of the airbag cushion comprises at least one of folding and rolling the first portion of the airbag cushion, and wherein the step of compressing the second portion of the airbag cushion comprises at least one of folding and rolling the second portion of the airbag cushion.

3. The method of claim 1, wherein the first portion of the airbag cushion comprises opposing sides of the airbag cushion positioned on opposite sides of the airbag cushion.

4. The method of claim 3, wherein the first portion of the airbag cushion comprises a top side of the airbag cushion and a bottom side of the airbag cushion relative to a vehicle incorporating the airbag cushion.

5. The method of claim 4, wherein the airbag cushion comprises an inflator opening, wherein the step of compressing the first portion of the airbag cushion comprises:
    at least one of folding and rolling the top side of the airbag cushion towards the inflator opening; and
    at least one of folding and rolling the bottom side of the airbag cushion towards the inflator opening;
    wherein the second portion of the airbag cushion comprises a first lateral side of the airbag cushion and a second lateral side of the airbag cushion relative to a vehicle incorporating the airbag cushion, and wherein the step of compressing the second portion of the airbag cushion comprises:
    at least one of folding and rolling the first lateral side of the airbag cushion towards the inflator opening; and
    at least one of folding and rolling the second lateral side of the airbag cushion towards the inflator opening.

6. The method of claim 1, wherein the first wrap comprises a weakened portion configured to break upon inflation of the airbag cushion, and wherein the second wrap comprises a weakened portion configured to break upon inflation of the airbag cushion.

7. The method of claim 6, wherein the weakened portion of the first wrap comprises a tear seam, and wherein the weakened portion of the second wrap comprises a tear seam.

8. The method of claim 1, wherein the steps of securing the first wrap about the compressed first portion and securing the second wrap about the compressed second portion are performed such that the first wrap extends at an angle relative to the second wrap.

9. The method of claim 8, wherein the steps of securing the first wrap about the compressed first portion and securing the second wrap about the compressed second portion are performed such that the first wrap extends in at least a substantially perpendicular direction relative to the second wrap.

10. The method of claim 1, wherein the airbag is configured to separate the second wrap prior to the first wrap during inflation of the airbag cushion.

11. A method for packing an airbag cushion, the method comprising the steps of:
- at least one of rolling and folding a first set of opposing sides of an airbag cushion towards an inflator opening of the airbag cushion to form a first compressed airbag configuration;
- securing an inner wrap about the first compressed airbag configuration, wherein the inner wrap is configured to break upon inflation of the airbag cushion to allow the airbag cushion to expand;
- at least one of rolling and folding a second set of opposing sides of an airbag cushion towards an inflator opening of the airbag cushion to form a second compressed airbag configuration, wherein the second set of opposing sides extend in a direction at least substantially perpendicular to the first set of opposing sides; and
- securing an outer wrap about the second compressed airbag configuration such that the inner wrap is positioned within the second compressed airbag configuration and within the outer wrap, wherein the outer wrap is configured to break upon inflation of the airbag cushion to allow the airbag cushion to expand, wherein the airbag is configured such that the outer wrap breaks prior to the inner wrap during inflation of the airbag cushion, and wherein the outer wrap is configured to separate with less force than the inner wrap upon inflation of the airbag cushion.

12. The method of claim 11, wherein the steps of securing the inner wrap about the first compressed airbag configuration and securing the outer wrap about the second compressed airbag configuration are performed such that the inner wrap extends at least substantially perpendicular to the outer wrap.

13. The method of claim 11, wherein the inner wrap comprises a weakened portion configured to break upon inflation of the airbag cushion to allow the airbag cushion to expand, wherein the outer wrap comprises a weakened portion configured to break upon inflation of the airbag cushion to allow the airbag cushion to expand, wherein the weakened portion of the outer wrap is configured to separate upon experiencing a first threshold force, wherein the weakened portion of the inner wrap is configured to separate upon experiencing a second threshold force, and wherein the first threshold force is less than the second threshold force.

14. A vehicle airbag assembly, comprising:
- an airbag cushion;
- an inner wrap positioned around a first portion of the airbag cushion, wherein the inner wrap is configured to separate upon inflation of the airbag cushion; and
- an outer wrap positioned around a second portion of the airbag cushion, wherein the outer wrap is configured to separate upon inflation of the airbag cushion, wherein the inner wrap is positioned within the outer wrap, wherein the inner and outer wraps are positioned and configured such that deployment of the airbag cushion with an inflator results in sequential separation of the inner and outer wraps, wherein the outer wrap is configured to separate upon experiencing a first threshold force, wherein the inner wrap is configured to separate upon experiencing a second threshold force, and wherein the first threshold force is less than the second threshold force such that a punch-out force associated with deployment of the airbag cushion is reduced at least in part by the differential between the first threshold force and the second threshold force.

15. The vehicle airbag assembly of claim 14, wherein the outer wrap is positioned and configured to separate before the inner wrap separates during deployment of the airbag.

16. The vehicle airbag assembly of claim 14, wherein the outer wrap is positioned at least substantially perpendicular to the inner wrap.

17. The vehicle airbag assembly of claim 14, wherein the inner wrap is positioned around the first portion of the airbag cushion such that there is slack between the inner wrap and the first portion of the airbag cushion.

18. The vehicle airbag assembly of claim 17, wherein the outer wrap is positioned around the second portion of the airbag cushion tightly such that there is no slack between the outer wrap and the second portion of the airbag cushion.

19. The vehicle airbag assembly of claim 14, wherein the inner wrap comprises a first material, and wherein the outer wrap comprises a second material distinct from the first material.

20. The vehicle airbag assembly of claim 19, wherein the first material comprises a stiffness greater than a stiffness of the second material.

21. The vehicle airbag assembly of claim 14, wherein the inner wrap comprises a weakened portion, wherein the outer wrap comprises a weakened portion, and wherein the weakened portion of the inner wrap is stronger than the weakened portion of the outer wrap such that the outer wrap is configured to separate with less force than the inner wrap.

22. The vehicle airbag assembly of claim 14, further comprising a second inner wrap positioned adjacent to the inner wrap around the airbag cushion, wherein the second inner wrap is configured to separate upon inflation of the airbag cushion along with the inner wrap.

23. The vehicle airbag assembly of claim 14, wherein the inner wrap is integrally coupled with the outer wrap.

* * * * *